INVENTOR
Howard M. Dodge
BY McCoy, Greene & LeBlanc
ATTORNEYS

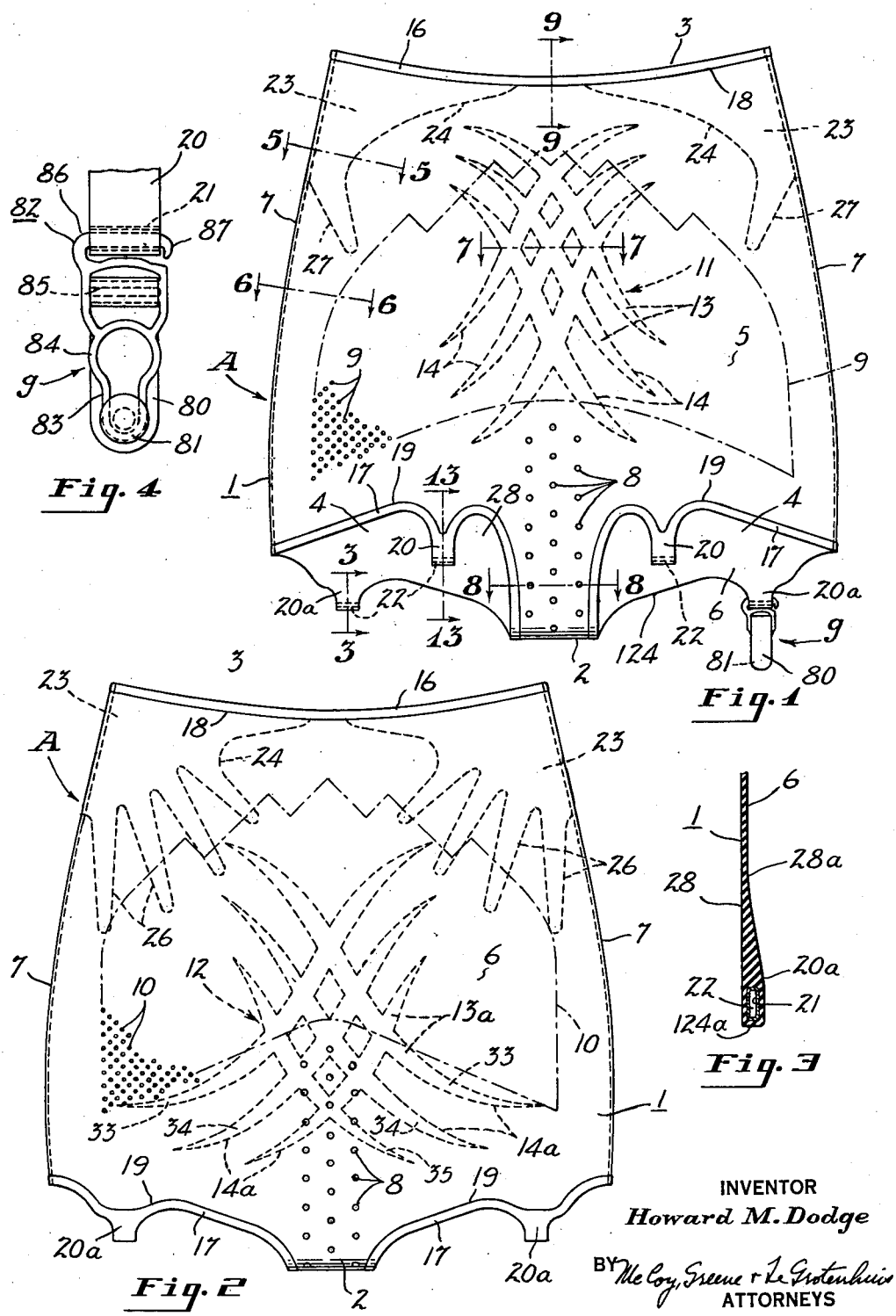

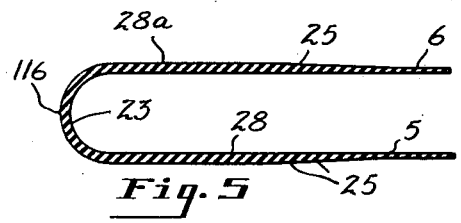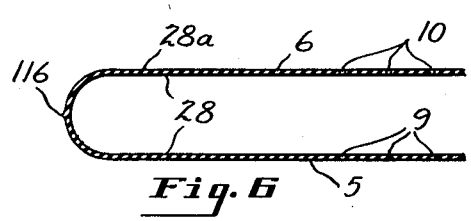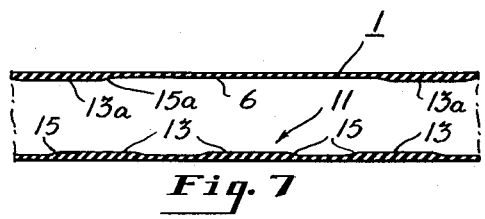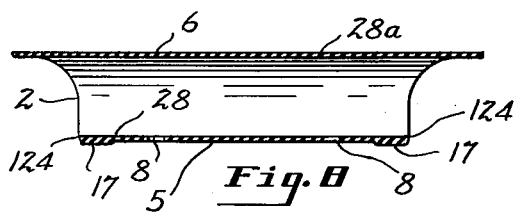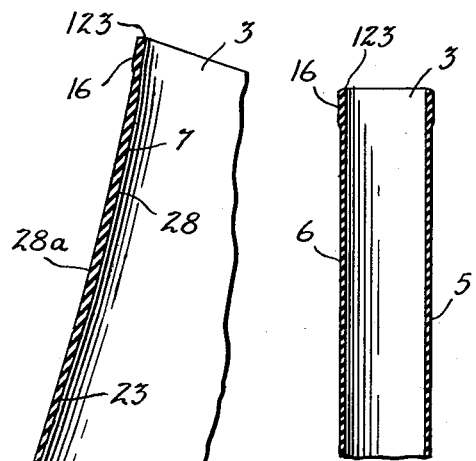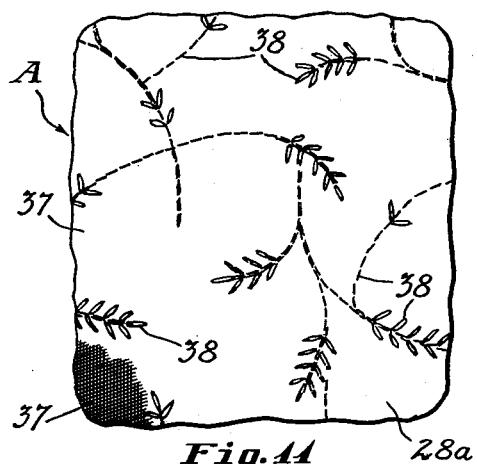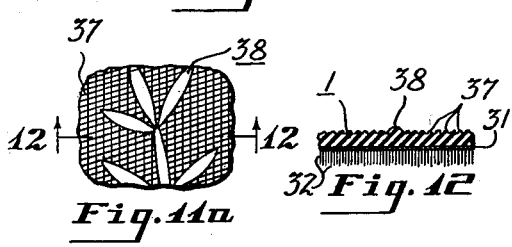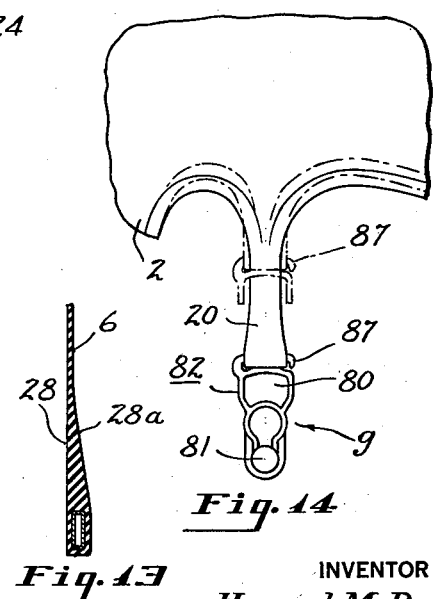
INVENTOR
Howard M. Dodge
ATTORNEYS Jan. 29, 1963  H. M. DODGE  3,075,532
MOLDED RUBBER GIRDLE Filed Feb. 2, 1959  7 Sheets-Sheet 3

Jan. 29, 1963   H. M. DODGE   3,075,532
MOLDED RUBBER GIRDLE

Filed Feb. 2, 1959   7 Sheets-Sheet 5

INVENTOR
Howard M. Dodge
BY McCoy, Greene & de Grootenhuis
ATTORNEYS

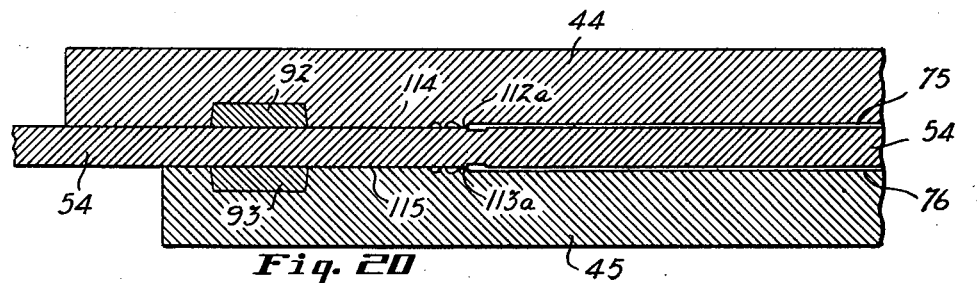
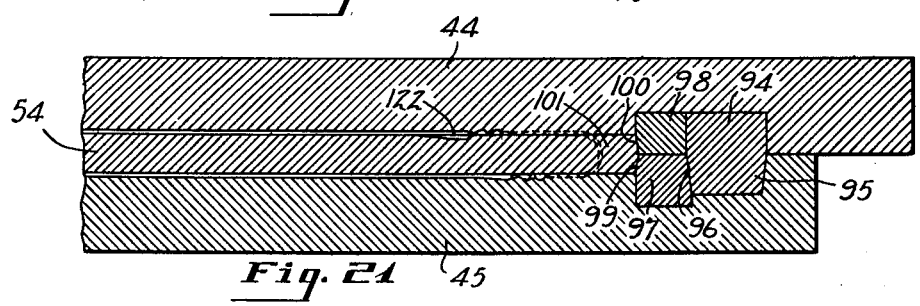
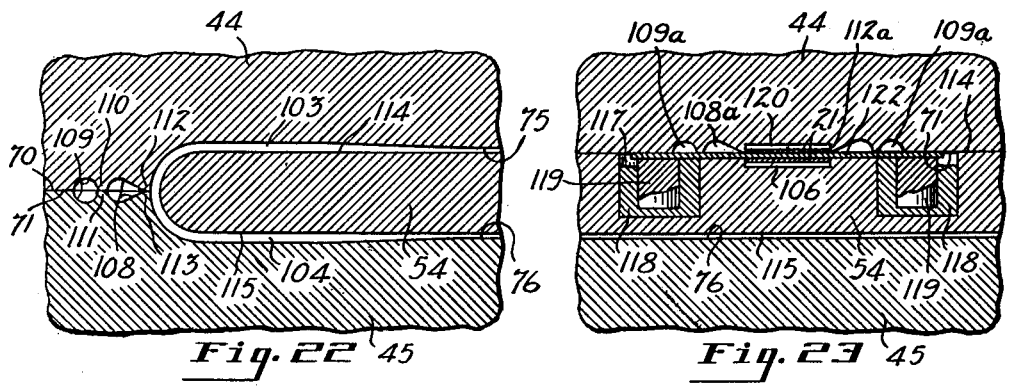
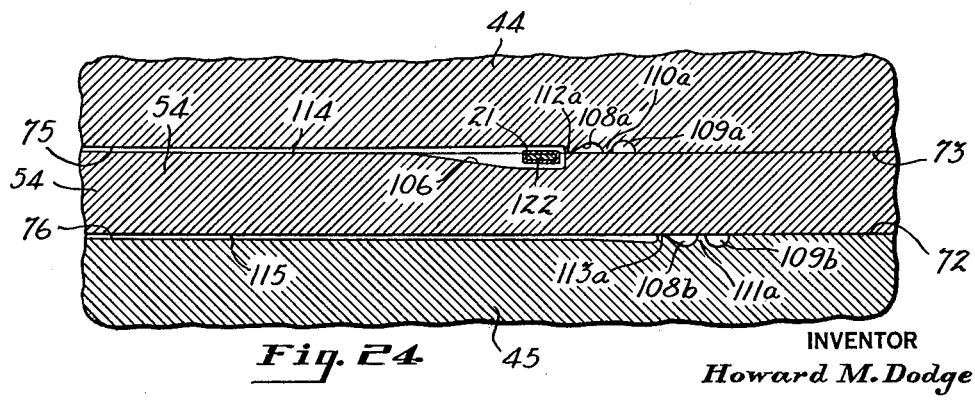

Jan. 29, 1963  H. M. DODGE  3,075,532
MOLDED RUBBER GIRDLE
Filed Feb. 2, 1959  7 Sheets-Sheet 7

INVENTOR
Howard M. Dodge
BY McCoy, Greene & LeStoubuis
ATTORNEYS

United States Patent Office 3,075,532
Patented Jan. 29, 1963

3,075,532
MOLDED RUBBER GIRDLE
Howard M. Dodge, Marion, Ind., assignor to The General Tire & Rubber Company, Akron, Ohio, a corporation of Ohio
Filed Feb. 2, 1959, Ser. No. 790,472
11 Claims. (Cl. 128—521)

The present invention relates to a one-piece elastic rubber girdle and more particularly to an integrally molded girdle formed from a curable reinforced masticated rubber compound.

Heretofore, a large percentage of the population has refused to use or purchase rubber girdles because of the various disadvantages thereof. Those girdles made prior to this invention and particularly deposited latex girdles were uncomfortable, irritating to the skin, and difficult to put on or take off. Pantie girdles had additional objectionable features. Prior girdles also failed to shape the body in an ideal manner or to provide maximum durability and tear resistance. The appearance of deposited latex girdles was improved by providing designs on the girdles but these increased the cost and it was difficult to provide fine detail in the designs. Many people refused to buy such girdles because of their poor appearance and tendency to collect and show dirt.

The present invention provides an inexpensive molded rubber pantie girdle or other girdle which is more comfortable and convenient to use, which provides much better shaping of the body, and which is more attractive and more durable than previously known rubber garments. Because of its low cost, its extremely high quality and its unusual advantages, the girdle of the present invention greatly increases the market for rubber garments. The invention is of a pioneer nature, and reverses a trend of thinking in the field of rubber garments which has persistend for two decades because it represents such a giant stride forward in the girdle art.

It will be understood that the term "girdle" is used herein in the generic sense to cover a girdle with or without a crotch and that such term does not exclude pantie girdles.

The rubber girdle of the present invention functions much better than previously known garments. The parts of the girdle contacting the stomach or abdomen and the buttocks are thickened so as to shape the body properly, and the parts at the uper sides of the girdle are thickened to provide reinforcing areas including finger-shaped portions which support the body in an ideal manner. The garter tabs and the portions of the girdle above the tabs are shaped so that the tension on the tabs stretches the main wall of the girdle and applies forces to the body which eliminate unsightly bulges. Since the molding operation permits the formation of gradual tapers and any desired change in thickness at different portions of the girdle, the girdle may be shaped to stretch at the right places and to apply pressure to the desired portions of the body without increasing the cost of manufacture. The result is an improvement in the functioning, the durability and the comfort of the rubber girdle.

The girdle of the present invention also incorporates improvements in the garter tabs which improve the quality and reduce the cost of the girdle. The fasteners used to connect the garter tabs to the woman's hose are removable and the garter tabs are provided with strength and tear resistance. A braided tube of cloth, metal or other material may be used to reinforce each garter.

Other improvements are made in the girdle to make it acceptable to more people. The girdle may be provided with a zipper to make it easier to get into and out of the garment or, in the case of the pantie girdle, the crotch strap may be detachable.

The outside surface of the girdle is provided with a fine design which remains attractive after the girdle is used many times, the molding operation permitting the use of fine detail because of the ability to reproduce the details almost exactly as they are provided on the mold surface. The designs do not project substantially beyond the outside surface of the girdle so as to interfere with sliding of clothes over the girdle or to present unsightly bulges. The main reinforceing areas of the girdle project inwardly so as not to mar the external appearance of the person wearing the girdle.

An object of the present invention is to provide an inexpensive one-piece rubber girdle which can easily be put on or removed.

A further object of the invention is to provide a rubber girdle which is comfortable to wear.

A still further object of the invention is to provide a durable inexpensive rubber girdle which shapes the body in an ideal manner.

Other objects, uses and advantages of the present invention will become apparent to those skilled in the art from the following description and claims and from the drawings in which:

FIGURE 1 is a front elevational view on a reduced scale of a pantie girdle constructed according to the present invention;

FIGURE 2 is a rear elevational view of the girdle shown in FIG. 1 and on the same scale;

FIGURE 3 is a fragmentary vertical sectional view taken on the line 3—3 of FIG. 1 and on a larger scale;

FIGURE 4 is a fragmentary front elevational view showing a garter constructed according to the present invention;

FIGURE 5 is a fragmentary sectional view taken on the line 5—5 of FIG. 1 and on a larger scale;

FIGURE 6 is a fragmentary sectional view taken on the line 6—6 of the FIG. 1;

FIGURE 7 is a fragmentary horizontal sectional view taken on the line 7—7 of FIG. 1;

FIGURE 8 is a fragmentary sectional view taken on the line 8—8 of FIG. 1;

FIGURE 9 is a vertical sectional view taken on the line 9—9 of FIG. 1 and on the same scale as FIGS. 5 to 8;

FIGURE 10 is a fragmentary vertical sectional view on an enlarged scale showing the construction at the upper side portion of the girdle of FIGS. 1 to 9;

FIGURE 11 is a fragmentary front elevational view showing a portion of the decorated outside surface of the girdle of FIGS. 1 to 10;

FIGURE 11a is a fragmentary view similar to FIG. 11 but on a larger scale to show the fine detail;

FIGURE 12 is a fragmentary sectional view taken on the line 12—12 of FIG. 11a;

FIGURE 13 is a fragmentary vertical sectional view taken on the line 13—13 of FIG. 1 and on a larger scale;

FIGURE 14 is a fragmentary front elevational view of the portion of the girdle near the garter tab, the portions of the girdle being shown in solid lines in their positions when the garter tab is stretched and being shown in dot-dash lines in their positions when the garter tab is in its normal unstressed condition;

FIGURE 20 is a fragmentary vertical sectional view taken on the line 20—20 of FIG. 18;

FIGURE 21 is a fragmentary vertical sectional view taken on the line 21—21 of FIG. 18;

FIGURE 22 is a vertical sectional view taken on the line 22—22 of FIG. 18;

FIGURE 23 is a fragmentary vertical sectional view taken on the line 23—23 of FIG. 18 and on the same scale as FIGS. 19 to 22;

FIGURE 24 is a fragmentary vertical sectional view of the empty mold similar to FIG. 21 and on a larger scale taken on the line 24—24 of FIG. 18;

Figure 15:
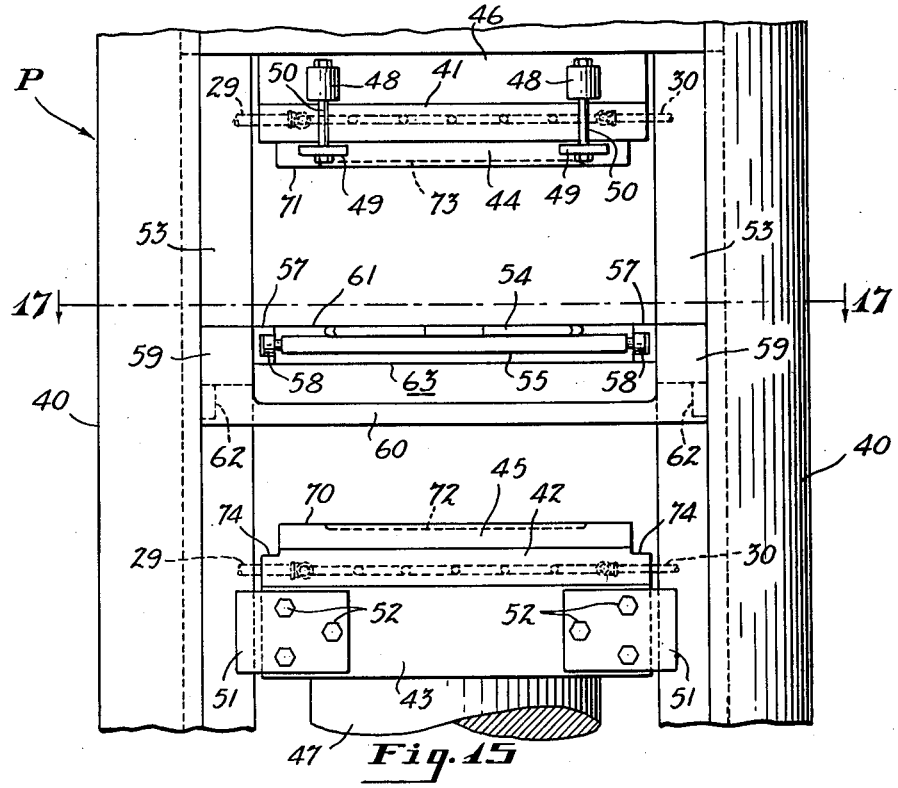
FIGURE 15 is a front elevational view on a reduced scale with parts omitted showing a molding press constructed according to the present invention and adapted to make the girdle shown in FIGS. 1 to 11, the parts being shown in their positions when the ram is in a retracted position.

Referring more particularly to the drawings in which like parts are identified by the same numerals throughout the several views, FIGS. 1 to 11 show a pantie girdle A having a main endless band or wall 1 of a size to fit the lower portion of the human torso and having a crotch portion 2 integrally connecting the front and rear portions of the wall 1. The girdle has a waist opening 3 at the top and two leg-receiving openings 4 at the bottom as best shown in FIG. 1. The main wall 1 has a generally flattened front panel 5, a similar rear panel 6, and curved side panels 7 integrally connecting the front and rear panels as best shown in FIG. 6. Three rows of regularly spaced large perforations 8 are provided at the bottom central portion of the girdle extending from the front panel across the crotch portion to the rear panel 6 as indicated in FIGS. 1 and 2 which are drawn substantially to scale. A multiplicity of closely spaced small perforations 9 are provided on the front and back panels 5 and 6 to form a symmetrical pattern as best shown in FIG. 1, and a multiplicity of similar closely spaced perforations 10 are provided on said panels to form patterns as shown in FIGS. 1 and 2.

The perforations 8, 9 and 10 must be formed accurately to avoid rough edges which could start tearing of the rubber. In a molding apparatus of the type disclosed herein, the perforations may easily be formed in the mold, but such perforations are usually formed by the punches of a perforating machine after the girdle has been molded and flocked. The perforations are shown with a tapered cross section as would be provided, for example, by a conical nose punch, similar to that disclosed in FIGURE 14 of applicant's copending application Serial No. 725,864, filed April 2, 1958.

The front panel 5 is provided at its center with an abdominal reinforcement area 11 and the rear panel 6 is provided with a similar posterior reinforcement area 12. The area 11 includes a series of crossing strip portions 13 of increased thickness having the shape indicated by the blend lines 14 in FIG. 1. The area 12 has similar thickened strip portions 13a having the shape indicated by the blend lines 14a. The blend lines 14 and 14a indicate the mid-points of the tapered surfaces 15 and 15a as shown for example in FIG. 6. The strip portions 13 and 13a thus gradually decrease in thickness at their margins so as to avoid lines of weakness in the wall of the girdle. If desired, the taper may be reduced even more to provide maximum comfort. The mold may be shaped to provide whatever taper is desired.

As indicated in FIGS. 1 and 2 each strip portion 13 or 13a extends toward the lower side edge of the girdle at one side thereof and the upper side edge of the girdle at the opposite side thereof, the strip portion gradually decreasing in width to a point at each end thereof. The arrangement of the strip portions 13 and 13a shape the body in a very effective manner. The narrow reinforcements 13 and 13a are applied like fingers to the weakened muscles of the body so as to act like auxiliary muscles and eliminate unsightly bulges. It will be apparent to those skilled in the art that the attractive design provided by the areas 11 and 12 may be varied somewhat without changing the functional characteristics of these areas.

An upper marginal edge reinforcement 16 is provided at the top edge of the girdle A and two marginal leg reinforcements 17 are provided at the periphery of the leg openings 4. The reinforcements 16 and 17 are thickened as shown in FIGS. 7 and 8 and the width of these reinforcements is indicated by the blend lines 18 and 19, each blend line indicating a gradual decrease in thickness at the margins of the reinforcement which avoids lines of weakness. The lower portion of the girdle has thickened portions adjacent to the leg reinforcements 17 which provide front and rear garter reinforcements or tabs 20 and 20a. The front tabs 20 are higher than the rear tabs 20a as indicated in FIG. 1 because of the fact that the rear panel 6 extends downwardly farther than the front panel 5. For this reason it is usually preferable to make the tabs 20 longer than the tabs 20a. Each of the tabs 20 and 20a has molded therein a flexible braided tube 21 of generally rectangular cross section as indicated in FIG. 3 which extends the full width of the tab so as to define a passage 22 for attachment of a garter g as will be described hereafter. The tube 21 may be made of metal, glass or other suitable material but is preferably made by braiding threads of cotton, rayon, nylon or the like which will adhere to rubber. If desired, a suitable adhesive may be employed to improve the adhesion of the tube to the rubber of the girdle.

Two hand-shaped areas 23 are provided at the upper sides of the girdle for engaging the hips and buttocks of the wearer, the general shape of each area 23 being indicated by blend lines 24. The blend lines indicate the mid-points of the tapered margins 25, the areas 23 gradually decreasing in thickness at said tapered margins so as to avoid stress concentration points in the wall of the girdle. As indicated by blend lines, each thickened area 23 has four finger-shaped portions 26 at the rear panel 6 extending downwardly two to four inches and has a thumb-shaped portion 27 at the front panel 5 extending downwardly toward the crotch portion 2.

The molded rubber girdle of the present invention is preferably flocked to provide an inner surface which is comfortable when in engagement with the skin. The pantie girdle A has a flocked inner surface 28 containing a multiplicity of fibers 32 (nylon, rayon, etc., usually cotton), embedded in the rubber of the adhesive layer 31 and has an embossed outer surface 28a which includes a raised flower design 38 as best shown in FIG. 11. If desired, this surface may also include stipling or extremely small designs to further improve the appearance of the article. As herein shown, the surface 28a is provided with an imitation cloth design 37 which gives the appearance of fine weaving.

The passages 22 of the garter tabs 20 and 20a are adapted to receive a conventional fastener such, for example, as the fastener shown in FIG. 4. This fastener includes a fabric garter tab 80 having bonded thereto a circular elastic rubber button 81. A metal fastening member 82 is provided for cooperating with the garter tab and button to support the hose surrounding the wearer's legs. The member 82 has an end portion 83 of a size to cooperate with the button 81 and has an intermediate portion 84 of larger diameter which is sufficiently large to permit removal of the button from the fastening member 82. Immediately above the portion 84 is a tab attaching portion 85 which is connected to the upper end of the garter tab 80. The fastening member 82 is provided at its upper end with a hook portion 86 having a curved end 87 as indicated in FIG. 4 which is drawn substantially to scale. The thickness of the fastening member 82 is less than the minimum cross-sectional dimension of each passage 22, and the vertical width of the portion 86 is less than the maximum cross-sectional dimension of the passage 22 so that the hook portion 86 will fit in the braided reinforcing tube 21 as indicated in FIG. 4. The end 87 is small enough to permit insertion of the hook portion 86 into the passage 22, the member 21 being flexible so as to yield with the rubber and permit such insertion.

The girdle A is constructed so that the main wall 1 thereof stretches to resist the pull of the garters and so that such pull assists in shaping the body in the desired manner. A portion of the wall 1 with a substantial area and free of reinforcement is provided above each of the garter tabs 20 and 20a to enable the girdle to function in this manner. Such portion is at least 2 inches square (i.e., at least 4 square inches) and preferably at least 3 inches square, and the rubber thereof has a substantially uniform thickness of about 0.02 to 0.04 inch, which thickness is preferably about the same as the average thickness of the main wall 1. Each garter tab is thickened at the bottom to reinforce the passage 22 and is tapered gradually as indicated in FIG. 3 or FIG. 13 so that it will stretch with the integral main wall 1 with which it is united.

Each tab and the adjacent portion of the main wall 1 is a homogeneous elastic rubber mass having a uniform chemical composition and free of irregularities in properties. The opposite surfaces of each tab are smooth and free of humps or abrupt changes in taper. Each tab 20 or 20a has a gradual substantially uniform taper which provides a change in thickness of about 0.03 to 0.06 inch per vertical inch. The taper at any two points on the garter tab spaced vertically 0.05 inch apart preferably varies no more than 10 percent. If desired, the cross sections of the tabs 20 and 20a may be exactly as shown in FIGS. 3 and 13 which are drawn substantially to scale.

The girdle of the present invention may be made in various ways but it is preferably made on apparatus of the type shown in FIGS. 15 to 24 which is constructed to facilitate low cost manufacture in a single operation without the necessity for trimming or assembling of the girdle. This apparatus includes a rigid metal frame having a pair of vertical standards 40 and an upper frame portion 46 which supports the top platen 41. The bottom platen 42 of the press is rigidly mounted on a ram cap 43 and is adapted to move with the ram cap toward and away from the top platen. The top and bottom platens are heated by steam which is supplied thereto by inlet pipes 29 and exhausted therefrom by outlet pipes 30.

A horizontal top mold section 44 is mounted in a fixed position on the top platen, and a similar bottom mold section 45 is rigidly mounted on the bottom platen 42 for vertical movement therewith. The mold section 45 and the platen 42 are rigidly connected to the ram 47. The mold section 44 and the top platen 41 are rigidly connected to the frame portion 46 in fixed positions by ears 49, bosses 48 and bolts 50 as will be apparent from FIG. 15. The bosses 48 are integral with the frame portion 46, and the ears 49 are integral with the top mold section 44. Four guide plates 51 are rigidly connected to the four corners of the rectangular ram cap 43 by bolts 52. The plates 51 slidably engage the standards 40 as the ram 47 moves vertically to guide the upper end portion of the ram.

Figure 16:
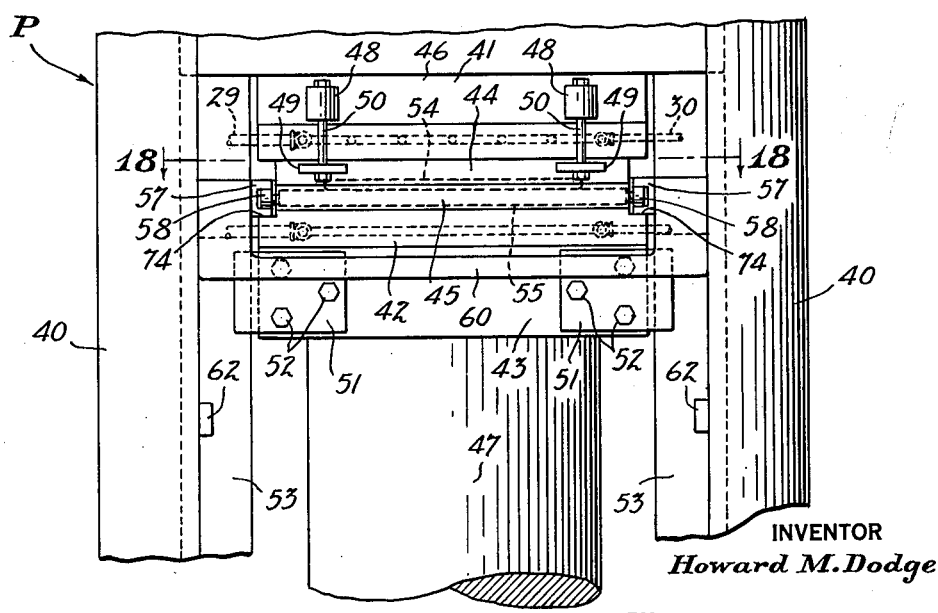
FIGURE 16 is an elevational view similar to FIG. 15 and on the same scale showing the press with the parts thereof in their positions when the ram is in its uppermost position.
Figure 17:
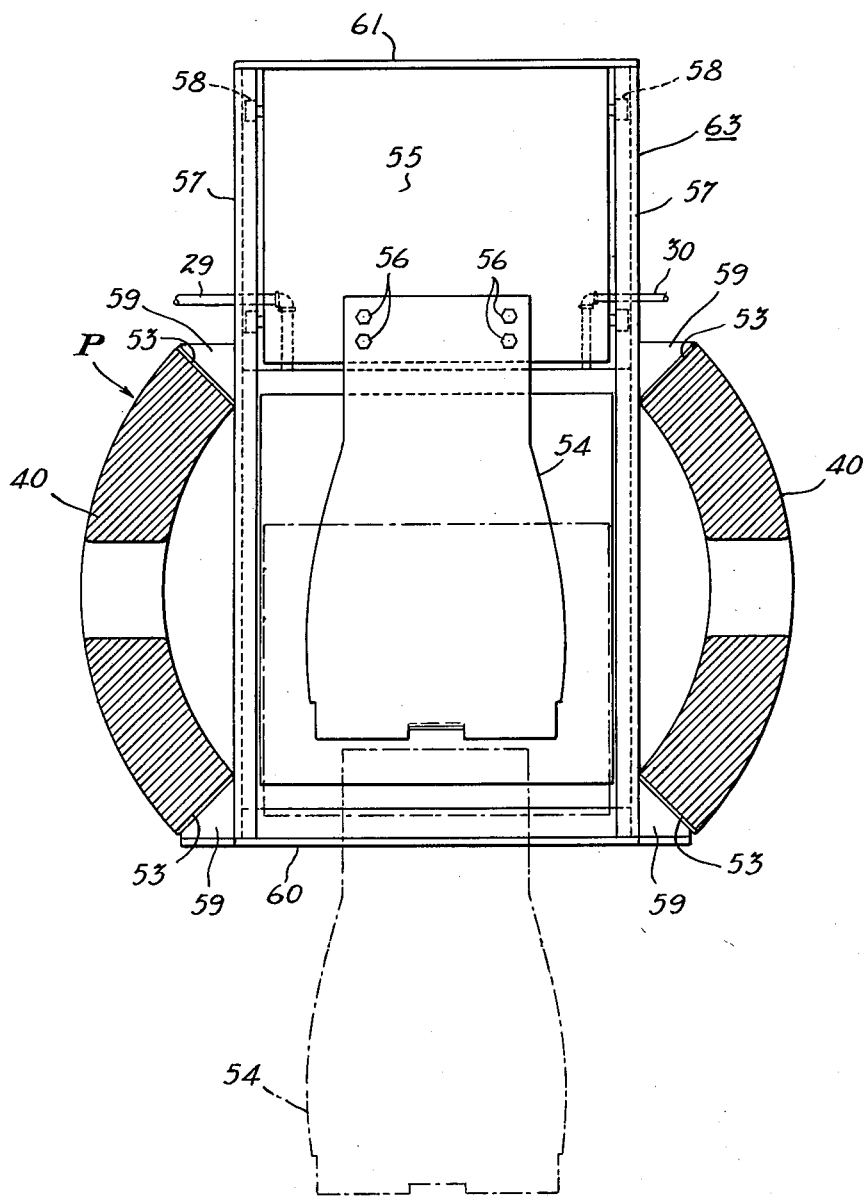
FIGURE 17 is a horizontal sectional view taken on the line 17—17 of FIG. 15 and on the same scale with parts being omitted, the core member being shown in solid lines in its normal molding position and being shown in dot-dash lines in its advanced stripping position.

A core member 54 having horizontal upper and lower faces is positioned between the top and bottom platens and is rigidly connected at one end to a horizontal carriage 55 by a series of bolts 56 so as to be supported in cantilever fashion. A pair of parallel horizontal guide channels 57 are provided for receiving the cylindrical rollers 58 of the carriage and for guiding the carriage horizontally, the recesses in the channels facing each other as indicated in FIG. 16. Four triangular guide portions 59 are welded to the channels 57 and slidably engage the inclined vertical faces 53 of the standards 40 so as to guide the frame 63 vertically and to prevent movement of said frame out of a horizontal position. The frame 63 comprises the channels 57, a flat connecting member 60 welded to the channels and to the portions 59 at one end of the frame, and a horizontal bar 61 welded to the ends of the channels at the opposite end of the frame 63, as best shown in FIG. 17.

Four metal stops 62 are rigidly connected to the standards 40 at the same elevation and engage the bottom of the frame 63 at four corners of the frame so as to support said frame in a horizontal position midway between the upper and lower platens as indicated in FIG. 15 when the ram is in its lower position. When hydraulic fluid under pressure is admitted to the hydraulic motor (not shown) that actuates the ram, the ram moves upwardly and the flat surface 72 of the bottom mold section 45 engages the flat bottom surface of the core member 54 to locate the frame 63 accurately in a horizontal position as the frame is lifted off the stops 62, the flat upper marginal surface 74 of the bottom platen 42 being held out of engagement with the channels 57. As the ram continues its upward movement, the frame 63 moves upwardly in unison with the ram.

Figure 18:
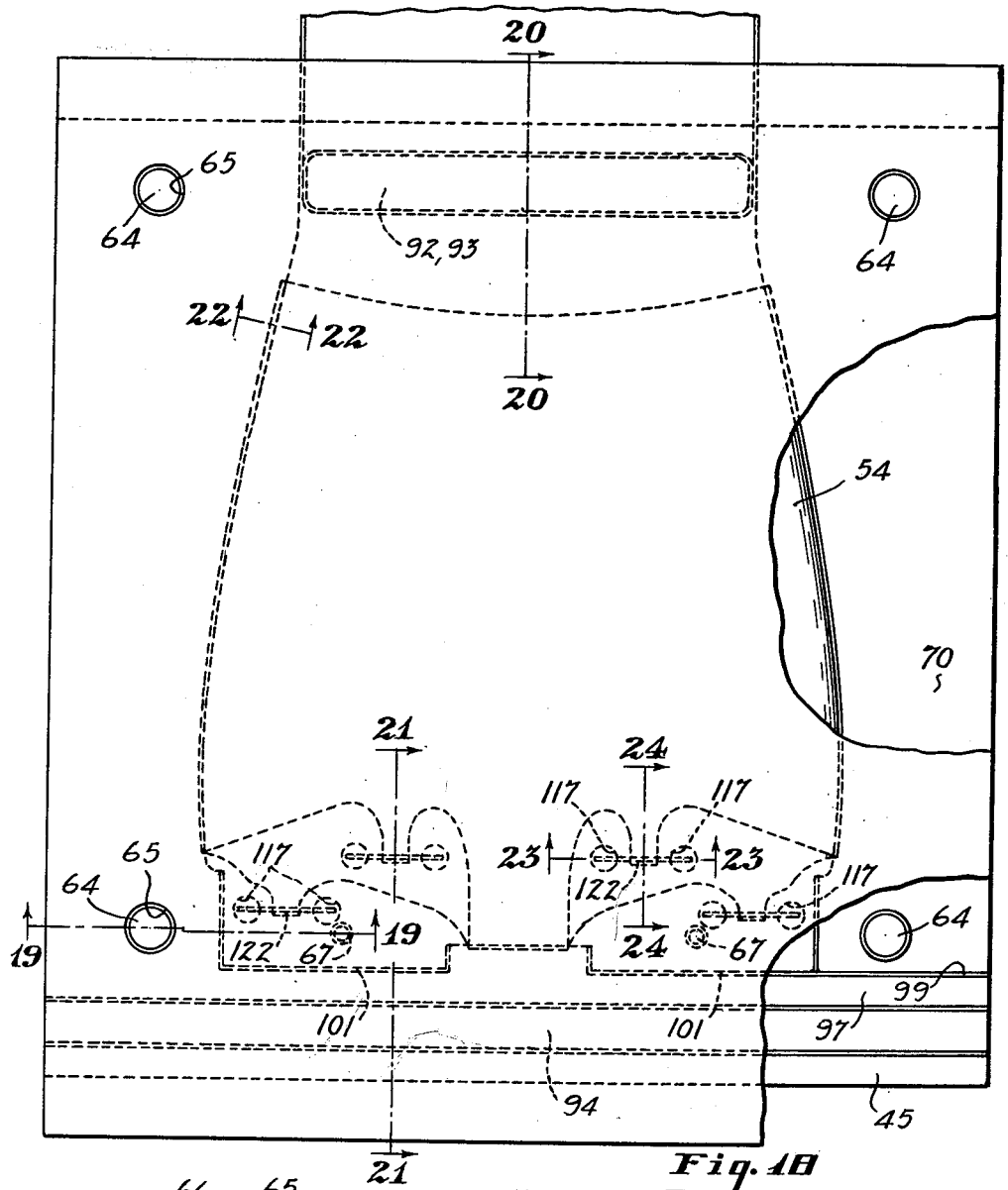
FIGURE 18 is a top plan view of the mold with parts omitted and with parts broken away as viewed on the line 18—18 of FIG. 16 and on a larger scale.
Figure 19:
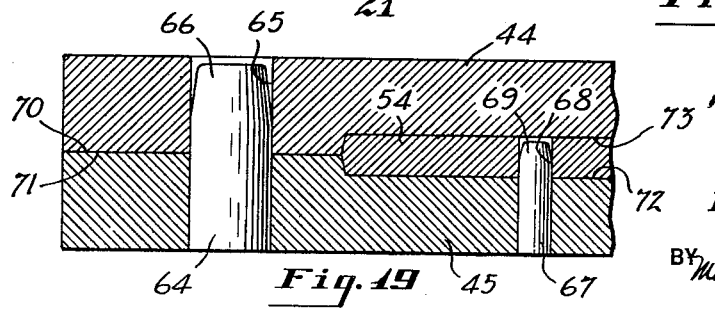
FIGURE 19 is a fragmentary vertical sectional view taken on the line 19—19 of FIG. 18 and on a larger scale.

Means are provided for guiding the core member 54 into the recess at 72 and for guiding the top and bottom mold sections together as indicated in FIG. 19, so that the various parts will fit together with very small tolerances. Four large dowels 64 are rigidly mounted in the bottom mold section 45 at the four corners thereof as indicated in FIGS. 18 and 19. These dowels have an external diameter corresponding substantially to the internal diameter of the four cylindrical holes 65 which are provided in the top mold section 44 in accurate axial alignment with said dowels. The upper end portions 66 of the dowels are tapered slightly to facilitate entry into the holes 65 as indicated in FIG. 19 which is drawn substantially to scale. A plurality of smaller dowels 67 are rigidly mounted in the bottom section 45 in axial alignment with the cylindrical holes 68 of the core member 54, said dowels having a diameter corresponding to that of said holes. The upper end portion 69 of each dowel 67 is tapered slightly like the portion 66 previously described.

The top and bottom mold sections 44 and 45 are provided with vertically aligned recesses of a size to receive upper and lower guide bars 92 and 93, said recesses and bars having a uniform cross section throughout their length as indicated in FIG. 20 which is drawn substantially to scale. The bars 92 and 93 are tapered as indicated in the drawings and are rigidly mounted on the core member 54 so that they move into, and out of, the cooperating recesses of the mold sections 44 and 45. The tapered surfaces of these bars facilitate guiding of the core member into the proper position relative to the top and bottom mold sections.

Further means are provided at the end of the core member for positioning the core member accurately including a long accurately machined bar 94 which is rigidly connected to the upper mold section 44 and which has a lower tapered portion 95 which fits accurately into a correspondingly shaped recess in the bottom mold section 45. The tapered portion 95 has a flat tapered surface 96 which engages a similar tapered surface on the transverse bar 97 which is rigidly connected to the bottom mold section 45. A bar 98 aligned with and above the bar 97 is rigidly connected to the mold section 44 and the bar 94 so as to remain at all times in a fixed position while the bottom mold section 45 and its bar 97 move vertically. The flat tapered surface of the bar 97 and the similar tapered surface of the bar 98 fit accurately against the similarly tapered surfaces of the end portion 101 of the core member 54 so as to position said end portion accurately relative to the top and bottom mold sections.

In the manufacture of a girdle, a sheet of rubber is placed on top of the core member 54 and a similar sheet of rubber is placed on the surface 72 of the mold section 45 while parts are in the position shown in FIG. 15. The total volume of the rubber sheets is predetermined so as to correspond substantially to the volume of the finished girdle whereby there is a very slight excess of rubber which may be pinched off by projecting portions of the mold sections. After the sheets have been positioned as indicated above, the fluid is admitted to the hydraulic motors to move the ram 47 upwardly to the position indicated in FIG. 16. As the bottom mold section 45 approaches the core member 54, the bar 93 enters the cooperating recess in the bottom mold section and the tapered surface 99 of the bar 97 engages the cooperating surface of the core member 54 to locate the core member accurately in a predetermined position relative to the bottom mold section.

As the bottom mold section 45 moves into engagement with the top mold section 44 the tapered surface 96 of the bar 95 and the tapered surface 100 of the bar 98 engage tapered surfaces of the bar 97 and the core member 54, respectively, and the bar 92 fits in the recess of the top mold section 44 to locate said mold section accurately relative to the core member 54 and the bottom mold section 45. The bars 92, 93, 94, 97 and 98 provide the accuracy needed for maintaining the desired wall thickness in the finished rubber girdle.

The shape of the elements 44, 45 and 54 will be apparent from FIGS. 18 to 24 which are drawn substantially to scale. It will be noted that the core-receiving cavity in the member 44 has a flat horizontal surface 73 parallel to the flat surface 72 of the mold section 45 and spaced therefrom a distance corresponding to the thickness of the core member 54 at the instant surfaces 70 and 71 are in engagement. At this instant the flat surface 75 of the mold cavity in the member 44 and the flat surface 76 of the mold cavity in the member 45 are parallel to the surfaces 72 and 73 and are spaced from the core member 54 a distance corresponding to the desired wall thickness of the main wall 29 of the girdle. The members 44 and 45 have recesses 103 and 14, respectively, which form the hip reinforcements 23 of the girdle as indicated in FIG. 22. Four recesses 106 are provided in the core member 54 for forming the garter tabs 20 and 20a. As herein shown, the mold cavity is located mainly between the flat upper and lower surfaces 114 and 115 of the core member and the shaped surfaces of the mold sections 44 and 45 whereby it is relatively easy to slide the finished girdle off of the core member at the completion of the molding operation. It will be understood that the members 44, 45 and 54 will be shaped to provide a mold cavity having a shape corresponding to the desired shape of the girdle A shown in FIGS. 1 to 11.

The mold sections 44 and 45 are shaped at the margin of the mold cavity so as to pinch off the excess rubber neatly throughout the periphery of the mold cavity whereby trimming of fins from the girdle is unnecessary. Two radially spaced parallel excess passages extend throughout the length of the margins of the leg- and body-receiving openings of the girdle and throughout the length of the parting surfaces at the sides of the girdle as will be apparent from an inspection of FIGS. 18 and 20 to 24. An excess passage at the parting surface (70–71) is formed by vertically aligned grooves 108 in the mold sections 44 and 45 at each side of the girdle in the manner indicated in FIG. 22. A similar excess passage of circular cross section is formed by the vertically aligned grooves 109 in the mold sections 44 and 45. These two excess passages extend along the side of the girdle from the top to the bottom edge thereof. Similar excess passages extend throughout the length of the top marginal edge of the girdle and throughout the length of the margins of the leg-receiving openings 4. The latter excess passages are defined by grooves 108a and 109a in the mold section 44 and similar grooves 108b and 109b in the mold section 45.

The mold sections 44 and 45 have projecting portions 110 and 111 between the grooves 108 and 109 which portions have flat surfaces parallel to the surfaces 70 and 71 which move substantially into engagement when the mold is closed as indicated in FIG. 22. The mold sections also have projecting cutoff portions 112 and 113 forming the radially inner sides of the grooves 108 which extend the full length of such grooves and which have cutting surfaces in the plane of the surfaces 70 and 71 which move into engagement when the mold sections move together as indicated in FIG. 22 to pinch off the excess material at the surface of the girdle from the top edge to the bottom edge thereof whereby a ridge 116 is formed at the sides of the girdle which is so small as to be hardly noticeable.

The mold section 44 has projecting portions 110a and 112a similar to the portions 110 and 112, and the mold section 45 has projecting portions 111a and 113a similar to the projecting portions 111 and 113 as indicated in FIG. 24. The portions 110a and 112a have surfaces which may be positioned substantially in the plane of the surface 73 of the member 44, and the portions 111a and 113a have surfaces which may be positioned substantially in the plane of the surface 72 of the mold section 45. The projecting portions 110a and 112a move substantially into engagement with the flat upper surface 114 of the core member 54, and the projecting portions 111a and 113a move substantially into engagement with the flat bottom surface 115 of the core member which is parallel to the surfaces 114, 72 and 73.

When full pressure is applied to the ram and the parts are in the positions indicated in FIG. 24, the clearance between each of the two projecting portions 112a and 113a and the core member is about zero to 0.001 inch and preferably less than 0.0005 inch, and the clearance between each of the projecting portions 110a and 111a and the core member is preferably 0.001 to 0.002 inch. The latter clearance is preferably 0.0005 to 0.002 inch greater than the first-mentioned clearance. The cutoff portions 112, 113, 112a and 113a are tapered in cross section as indicated in FIGS. 22 and 24 so as to pinch off the rubber in the most effective manner while retaining the required strength and wear resistance. The portions 112 and 113 form the ridges 116 at the sides and the crotch of the girdle and the portions 112a and 113a form the ridges 123, 124 and 124a at the margins of the waist and leg-receiving openings.

The apparatus used to make the girdle of the present invention forms the ridges 116, 123, 124 and 124a with a high degree of accuracy so that each of these ridges has a uniform pointed cross section throughout its length and serves to reinforce the girdle. Said cut off portions are preferably shaped so that the height of each ridge is less than 5 percent of the average thickness of the main wall 1 whereby the ridge is hardly noticeable. Such ridge may easily be buffed off but this increases the cost of manufacture and increases the likelihood of weakening the girdle wall or tearing the rubber. Ridges of uniform cross section as formed by the molding apparatus of the present invention cannot be produced by any other practical method. The trimming of fins from a molded rubber article produces scissors cuts and sharp edges which tend to start tears in the rubber and the ridges produced to not have a uniform cross section. Tearing of fins from a molded rubber article is very undesirable because it produces jagged edges at which tears will start. The ridges produced by these prior art methods do not reinforce the girdle but provide points of weakness.

The provision of two parallel excess passages instead of one controls flow of the rubber and greatly facilitates elimination of unsightly fins at the margins of the girdle so as to eliminate the cost of trimming the girdle. The apparatus of the present invention trims the garment effectively during the molding operation to accomplish a result which has not previously been obtainable by those skilled in the art.

The core member 54 is provided with eight cylindrical recesses 117 which receive eight cylindrical bronze cups 118 of the same diameter. These cups have cylindrical recesses therein which receive eight cylindrical permanent magnets 119, each recess 117 being located on one side of a recess 106 in alignment with another recess 117 in the corresponding position on the opposite side of the recess 106 as indicated in FIG. 23. A recess 120 is provided in the mold section 44 directly above the recess 106 to form a portion of the garter tab 20 or 20a. The steel insert 122 is placed within the flexible braided tube 21 and positioned in the opening formed by the recesses 120 and 106 as indicated in FIG. 23, the insert being relatively flat so that the outer ends thereof will lay flat on the magnets 119, whereby the insert is accurately positioned. After the completion of the molding operation the inserts 122 may be readily removed from the magnets and slid out of the braided tubes 21 which are then bonded to the rubber. The tube 21 is sufficiently flexible to permit sliding an insert 122 therethrough even though the insert has bends therein.

In the manufacture of girdles according to the present invention, the core member 54 is placed substantially in vertical alignment with the mold cavities of the top and bottom mold sections 44 and 45 as indicated in solid lines in FIGS. 15 and 17. Sheets of rubber having a total volume very slightly greater than the volume of the girdle being manufactured and no greater than the latter volume plus the volume of the first excess passages 108, 108a and 108b, are placed on the upper surfaces of the core member 54 and the bottom mold section 45. The valves controlling the application of hydraulic pressure are then moved so as to admit hydraulic fluid to the ram 47 so as to elevate the ram. As the ram moves upwardly the guide bars 93 and 97 position the core member 54 relative to the mold section 45 and the core member is lifted by the ram so as to cause the frame 63 to move upwardly between the standards 40. As the parts approach the position shown in FIG. 16 the guide bars 92 and 94 are effective to guide the core member and the bottom mold section into the proper position relative to the upper mold section 44.

As the pressure builds up between the core member and the top and bottom mold sections, the rubber of the sheets, which are then in engagement with the surfaces 75 and 76, flows so as to fill all the cavities of the mold including the recesses 106 and 120 surrounding the braided cloth tubes 21. Extremely high pressures of 2000 to 4000 pounds per square inch are employed to obtain the proper flow of rubber and to insure that the rubber is homogeneous and has uniform chemical and physical properties throughout the girdle. The upper and lower platens 41 and 42 are heated so as to heat the rubber to the proper vulcanizing temperature during the molding operation. The press is held in the closed position as indicated in FIGS. 16 and 18 to 24 for a predetermined period of time sufficient to cure the rubber to the elastic state. It will be understood, of course, that the girdle may be cured in the mold and then given a final cure outside the mold after the flocking operation.

After the molding operation is completed, the application of hydraulic pressure is discontinued and the ram 47 is allowed to drop so as to permit the frame 63 to move away from the upper platen. The weight of the frame 63 and the parts carried thereby is sufficient to separate the rubber of the girdle from the surfaces of the upper mold section. As the ram moves downwardly the frame 63 moves into engagement with the stops 62 which terminate such downward movement and support the frame in a horizontal position. The continued downward movement of the ram separates the bottom mold section from the girdle. The carriage 55 is then moved horizontally from its normal operating position shown in solid lines in FIG. 17 to a stripping position as shown in dot-dash lines in FIG. 17, the rollers 58 facilitating such movement. The plate 60 limits the horizontal movement of such roller so as to prevent separation of said carriage from the frame 63.

When the carriage is in said stripping position, the core member 54 projects outwardly from the press where it is readily accessible to the operator. The operator then removes the metal insert 122 from each of the braided tubes 21 and removes the garter tabs from the recesses 106. The girdle may then be stretched slightly so as to remove the girdle from the core member 54. The resulting girdle is substantially free of fins or the like and need not be trimmed. The outer surface 28a of the girdle has configurations which accurately duplicate the design on the mold surfaces, the high pressure applied during molding providing perfect designs. Since the girdle is molded inside out the inner surface 28 thereof faces outwardly.

After removal from the core member the girdle may be mounted on a suitable supporting form and the entire inner surface 28 may be covered with a thin layer of a suitable rubber cement in the manner described hereinafter. While the mold is mounted on the supporting form, fibers are then deposited on the cement layer by an electrostatic flocking process. The girdle is then heated to cure the cement layer and to cure further the girdle itself so as to complete the article.

After the girdle is molded and after the flocking operation, the girdle may be placed in conventional perforating machines so as to cut the perforations 8, 9 and 10 as will be apparent to those skilled in the art. Perforation is preferably performed by apparatus similar to that disclosed in FIGURE 14 of applicant's copending application Serial No. 725,864, filed April 2, 1958.

After one girdle is removed from the core member 54, four new braided tubes 21 are provided and an insert 122 is inserted into each braided tube. Each insert is then positioned on a pair of magnets 119 so as to support the braided tube in the recess 106 as indicated, for example, in FIG. 23. The four braided tubes are mounted in this manner on the core member 54 before the core member is returned to its position in alignment with the mold recesses as shown in solid lines in FIG. 17. Thereafter the rubber sheets are mounted on the core member and in the bottom mold recess as described previously and the cycle is repeated to complete another girdle.

The apparatus used to make the girdle of the present invention is able to operate under extremely high pressure and trims the article much more effectively because of the fact that the core member 54 is flat and substantially free of deep grooves such as those provided to form the reinforcing areas 11, 12 and 23. This flat construction greatly improves the accuracy in the molding operation and permits the formation of extremely small designs on the outside surface of the girdle. Applicant has discovered a novel method of producing accurately fine designs on a flat surface which method uses acid to etch the flat surface. By making the opposite faces of the core member 54 generally flat and parallel, it is possible to employ this process and to thereby produce very beautiful designs which could not possibly be provided on mass-produced rubber girdles by any of the methods known prior to this invention. Because of the invention, it is practical, for example, to produce a girdle having an outside surface with the shape corresponding almost exactly to that of a woven cloth garment having a design sewed thereon. Each thread in the design can be reproduced in every garment with amazing accuracy. Because of the ability to produce fine designs, the tendency of the girdle to collect and show dirt can be minimized so that rubber girdles are acceptable to a larger percentage of the population.

The flat construction employed in the molding apparatus of this invention in combination with the other features of the apparatus, permits the making of very thin rubber articles having a quality which is unexpectedly high for molded articles and a cost which is unexpectedly low. Such construction also permits molding and curing at extremely high pressures which produce the highest quality cured rubber. Because of the unusual advantages of the invention, the molded rubber girdle promises to replace the deposited latex girdle. Because of the many advantages of the invention and the failure of others to produce the invention, it becomes apparent that the invention would not and did not occur to those skilled in the art in spite of its simplicity as viewed by hindsight.

The molded girdle has many unexpected advantages. The cured masticated rubber compound, which contains reinforcing fillers in addition to the curing agents and other ingredients, does not stretch as freely as cured latex rubber under low tension and therefore is better able to shape the body in the desired manner. The molded girdle is found to have many other advantages over deposited latex girdles, the curing under extremely high pressure imparts ideal physical properties to the rubber which are uniform throughout the entire garment.

The girdle A shown herein shapes the body in an ideal manner. The thickened strip portions or ribs 13 forming the abdominal reinforcement and the similar strip portions or ribs 13a forming the posterior reinforcement are shaped and located so as to act as auxiliary muscles and apply forces to the body which eliminate unsightly bulges. The ribs 13 and 13a are inclined so as to resist both vertical and circumferential stretching of the main wall and gradually decrease in width generally to a point at their ends so that the reinforcing effect gradually decreases towards the outer boundaries of each reinforced area. These ribs are spaced apart so that the portions of the main wall 1 between the ribs can stretch vertically and/or circumferentially, the ability of said portions to stretch gradually increasing as the width of the ribs decreases.

The ribs 13 forming the abdominal reinforcement have a varying inclination which is generally in the neighborhood of 60° to 70° relative to the horizontal and are located directly over the abdomen of the wearer to reduce the bulge in this area. The ribs 13a forming the posterior reinforcement are designed to lift the buttocks and are, therefore, positioned lower on the girdle with the lower portions 33, 34 and 35 of the ribs extending generally in a circumferential direction and engaging the inwardly curved lower portion of the buttocks. Said lower portions of the ribs 13a are inclined at an angle less than 40° and preferably less than 30° relative to the horizontal when the girdle is in the upright position shown in FIG. 2 so as to provide resistance to circumferential stretch in the area of the inwardly curved portions of the buttocks about 60% to 90% of the way down from the top edge of the girdle. The latter area extends horizontally about 70% to 90% of the width of the rear panel 6, as indicated in FIGURE 2.

The bottom halves of the ribs 13a are located within an enclosed area of generally trianguloidal shape having a width of preferably about 10 to 14 inches and gradually decreasing in height toward its opposite sides. The lower portion of this area located near the lower inwardly curved portion of the buttocks between two horizontal planes spaced three inches apart would preferably cover about 15 to 25 square inches and have a maximum width of about 10 to 14 inches.

The reinforcing ribs located within said lower portion of the trianguloidal area could have exactly the same size and shape the rib portions 33, 34 and 35 shown in FIG. 2 which is drawn to scale or could be arranged in various other ways to provide resistance to circumferential stretch which gradually decreases towards the sides of the girdle, and these ribs have vertical cross sectional areas which preferably decrease in magnitude in a direction away from the medial vertical plane of the girdle. The reinforcements at 12 are similar to the reinforcements at 11 in that their total cross sectional area in any plane gradually decreases in a direction away from the main central portion thereof, but the reinforcements at 12 provide more resistance to circumferential stretch at the lower portion of the buttocks to impart the desired amount of lift.

The reinforcing areas 23 may be made exactly as in the drawings, which are drawn substantially to scale, or may be shaped somewhat differently to provide substantially equivalent results. Each of these areas is preferably hand-shaped with finger portions 26 each having a length of 3 to 4 inches and a width of 0.4 to 0.7 inch.

The remaining portion of each reinforcing area 23 preferably is in the form of a trianguloid that gradually increases in height from each end thereof. Each end of the trianguloidal portion is preferably within one inch of the medial vertical plane of the girdle as indicated in FIGS. 1 and 2. The trianguloidal portion of each reinforcing area 23 usually has its maximum height at or near the ridge 116 and extends from the top side edge of the girdle at the top end of said ridge downwardly a distance that is about 20 to 30% of the average height of the girdle and usually about ⅓ to ¼ the vertical length of the ridge 116.

The trianguloidal portions of the two reinforcing areas 23 preferably extend substantially to the top edge of the girdle throughout at least nine-tenths of its circumference so as to shape the body in the most desirable manner. These portions are quite different from prior trianguloidal hip reinforcements which were relatively small and did not provide much resistance to circumferential stretching of the girdle.

The downwardly projecting finger portions 26 provide results quite different from anything known prior to this invention. These finger portions extend generally away from a point at the nearest upper side edge of the girdle (at the top of the ridge 116) and have lower ends spaced from said point a distance which is preferably 35% to 45% of the average height of the girdle so as to define a reinforced zone having high resistance to stretching in a direction away from said point and much lower resistance to circumferential stretch.

The finger portions 26 gradually decrease in width toward their ends and the length of each of such portions is longer than those finger portions 26 nearer the center of the girdle, whereby the cross section of each reinforcing area 23 gradually decreases in a direction away from the nearest upper side edge of the girdle. The areas 23, therefore, cause a downward pressure to be applied to the upper side portions of the buttocks and shape the body in the desired manner.

It will be apparent that the crotch portion 2 may be omitted from the gridle A and that the reinforcing areas of the girdle may have various shapes somewhat different from that shown in FIGURES 1 to 11. FIGURES 25 to 29 show a modified form of girdle A' which is molded without a crotch. This girdle is molded in one piece like the pantie girdle A and may have designs and reinforcing areas substantially the same as the girdle A. The girdle A' has an endless main wall or band 130 having a front portion 131 similar to the panel 5 and a rear portion 132 similar to the panel 6. The girdle has an upper marginal portion 133 of increased thickness, similar to the reinforcement 16, which surrounds the waist opening 134 and has a lower marginal portion 135 of increased thickness, similar to the leg reinforcements 17, which surround the leg opening 136.

It will be noted that the girdles A and A' have a waist opening at the top and at least one leg opening at the bottom. The term "leg opening" as used in the specification and claims is used in the generic sense to cover an opening for receiving either one or two legs.

Figure 27:
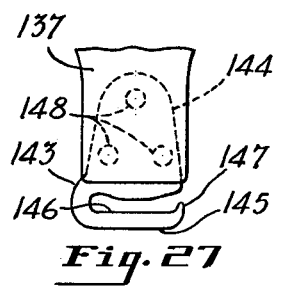
FIGURE 27 is a front elevational view of the garter portion of the girdle of FIGURE 25 on a larger scale.

The front portion 131 of the girdle is provided with integral garter tabs 137 and the rear portion 132 of the girdle is provided with similar integral garter tabs 138, each tab gradually decreasing in thickness like the tabs 20 and 20a so as to provide smooth tapered surfaces 139. The portions 131 and 132 are provided with suitable air passages, such as the perforations 9, for ventilation. Metal plates 143 are provided for attachment of conventional fasteners to the garter tabs. Each plate has a rounded portion 144 embedded in each tab 137 and 138 and is vulcanized to the rubber of the tab. The plates 144 are placed in the mold before forming and molding the girdle A' so that the rubber will be cured around said portion and so that the rubber will surround and adhere to the plate as is apparent from FIGURES 27 and 28. Each plate 143 has a horizontal hook portion 145 which is spaced from the portion 144 to provide a narrow slot 146 as shown in FIG. 27, the end portion 147 being turned upwardly to prevent accidental detachment of the strap which is placed in said slot. It is preferable to provide a series of holes 148 in the portion 144 which will become filled with rubber during the high pressure molding operation so as to anchor the plate firmly in place.

The girdle A' has a flocked inner surface 140, which is similar to the surface 28, and contains a multiplicity of fibers 32 of cotton or other suitable material, and has an embossed outer surface 141 similar to the surface 28a. Such fibers are electrostatically deposited in the adhesive layer 31 while the layer is uncured in the "open" condition to receive the fibers. The masticated rubber compound used to form the adhesive layer 31 is compounded so as to avoid the formation of a skin on the surface of the adhesive during the flocking operation and to provide, after curing, an elastic rubber layer having the same physical characteristics as the main wall of the girdle.

The reinforced portion 135 of the girdle A' has thickened parts 155 at the bottom center of the wall portions 131 and 132 for receiving conventional snap fasteners of the type used, for example, on bathing caps and other rubber articles. These thickened portions are provided to permit use of a crotch strap 156 if it is desired to use the girdle as a pantie girdle. The crotch strap may be of the type shown in FIGURE 26 which has rounded end portions 157 of increased thickness that receive a series of conventional snap fasteners 158 and has marginal portions 16 to reinforce the side edges of the strap. The strap may also be provided with a series of perforations 159 similar to the perforations 8. The snap fasteners on the detachable crotch strap 156 may easily be connected to or separated from the complementary fasteners provided at the portions 155 of the girdle as will be apparent from FIGURE 25. It will be understood that a removable strap similar to the strap 156 may be provided on a girdle very similar to the pantie girdle A and various other girdles constructed according to the principles of this invention.

A girdle constructed according to the present invention may be split in the upper section thereof and provided with a zipper or other fastener so as to make it easier to get into and out of the girdle. As herein shown, the girdle A' is provided with a slide fastener, the wall of the girdle being reinforced with fabric in the area of said fastener. It will be understood that the slide fastener and the associated parts of the girdle shown in FIGS. 25 and 30 may be employed on the pantie girdle A or any other girdle constructed according to this invention.

In the manufacture of the girdle A', a rectangular fabric reinforcing strip 165, with a length several times its width, is placed between two sheets of uncured rubber and located in the portion of the mold where the cavity has been increased slightly in size to accommodate such strip. The molding operation is otherwise exactly the same as for the girdle A, the high pressure causing the rubber to flow so as to fill the mold cavity completely and to force the excess rubber into the excess passages corresponding to the passages at 108, 108a and 108b. The girdle is cured in the mold under high pressure exactly like the girdle A whereby the strip 165 is vulcanized to and sandwiched between inner and outer rubber layers 169 and 170. After the inner surface 140 of the girdle has been electrostatically flocked and either before or after the perforating operation, the portions 169 and 170 and the strip 165 are cut near the center thereof to form a narrow upright slot 171 with a length of at least 3 inches and a width no greater than one-half inch and usually less than one-fourth inch extending downwardly from the waist opening 134. This slot terminates above the lower end 173 of the strip 165 and divides the strip into two rectangular portions 166 having straight edges 167 flush with the rubber edges of the slot. The upper end 172 of the slot opens to the waist opening whereby the upper portion of the girdle wall 130 is circumferentially discontinuous.

Figure 25:
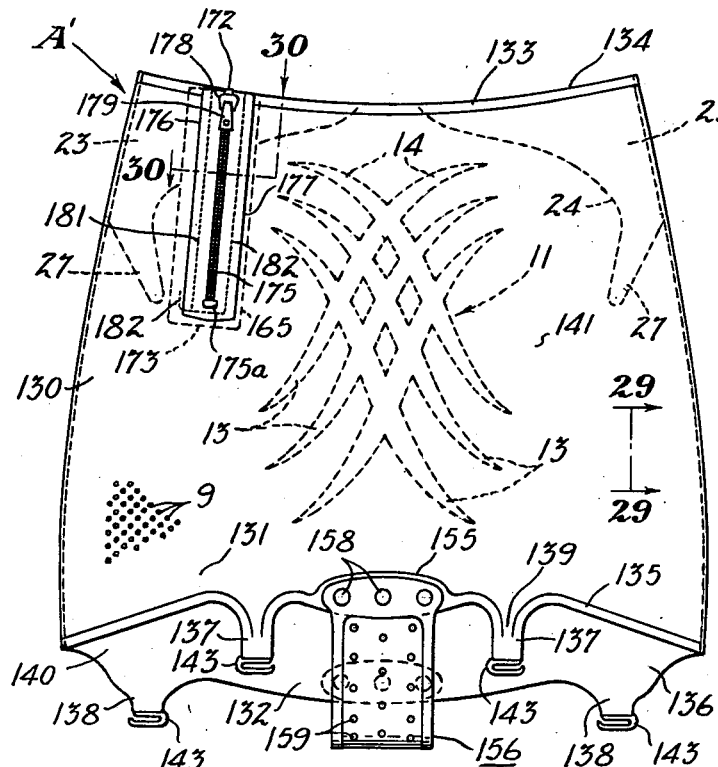
FIGURE 25 is a front elevational view on a reduced scale, with parts omitted, showing a modified form of pantie girdle according to the present invention.
Figure 26:
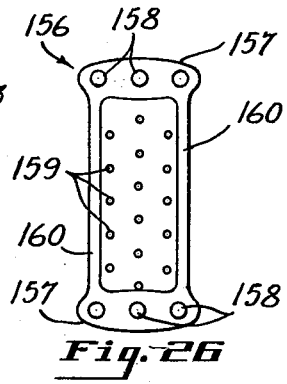
FIGURE 26 is a plan view of the crotch strap employed with the girdle of FIG. 25.
Figure 30:
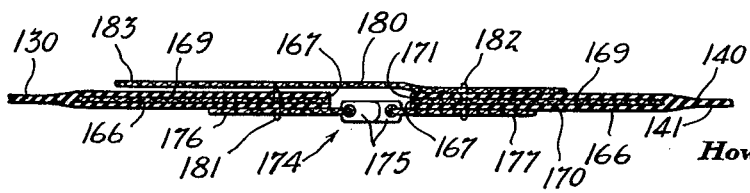
FIGURE 30 is a fragmentary horizontal sectional view taken on the line 30—30 of FIGURE 25 on a larger scale.

A conventional slide fastener 174 may be provided for connecting the separated portions of the wall 130. Such fastener comprises two detachable rows of interfitting metal elements which are mounted on a fabric tape in a conventional manner, said elements extending from the end of the tape to the metal stop 175a and being equally spaced in each row. One row of elements 175 is mounted on the straight edge portion of the rectangular tape portion 176 and the other row of elements 175 is mounted in complementary fashion on the similar rectangular tape portion 177. A metal slider 178, having a tab 179 for manual operation, is slidably mounted on the elements 175 and is provided with means for joining said elements to close the fastener as is well understood in the art. The portions 176 and 177 of the rectangular tape carrying the slide fastener 174 have a length no greater than that of the strip 165 and are placed on the outer surface of the girdle so that the interfitting elements 175 are located in alignment with the slot 171 as indicated in FIGS. 25 and 30. It is preferable to provide a skin-engaging fabric flap 180 on the inner surface 140 of the girdle to cover the slot 171 as indicated in FIGURE 30. The tape portion 176 may be attached to the girdle wall by a line of stitching 181 which extends through the fabric portion 166, the rubber portions 169 and 170 and the tape portion 176 as indicated in FIG. 30. A similar row of stitching 182 extends through the portions 166, 169, 170, and 177 and also through the flap 180 so as to attach one side of the flap to the girdle wall, the opposite side 183 of the flap being spaced from the stitching 181 and separate from the girdle wall. The stitching 182 is preferably extended from the tape portion 177 to the tape portion 176, as indicated in FIG. 25, so as to resist opening of the flap 180 below the metal element 175, whereby the flap tends to remain parallel to the girdle wall at all times.

It will be understood that the term "integral" is used in the specification and claims to indicate that different parts are formed at the same time as a homogeneous unit rather than being integrally connected together after forming of each element.

Each of the girdles A, A', and A² shown in the drawings may be made in different sizes to fit different people, but it will be understood that each of these girdles may be made exactly in the proportions indicated in the drawings and that, where the dimensions of certain parts of the girdle are given in inches, such dimensions apply to girdles having sizes within the usual ranges (i.e., a waist with a circumference of 18 to 40 inches).

The girdle A shown of unstressed rubber in FIGS. 1 to 14 has a waist opening 3 with a circumference of 25 inches, a vertical height at the ridge 116 of 14 inches, a maximum circumference of 32 inches and a vertical height (from the top to the bottom of the crotch portion 2) of 16 inches, but it will be understood that the size of such girdle may vary considerably. The girdles A' and A² may obviously have the same size as the girdle A if desired.

The masticated rubber composition used to make girdles according to the present invention may be made in various ways to provide high tensile strength and other desired properties, and it will be understood that the following description is by way of illustration rather than limitation. Such composition usually contains 100 parts by weight of natural, GR-S or other synthetic rubber (preferably natural rubber) and 15 to 80 parts by weight of fillers including finely divided or colloidal reinforcing materials such as silica or calcium silicate.

The composition usually contains vulcanizing agents, accelerators, coloring agents, antioxidants and other conventional compounding ingredients to provide a rubber product which can be worn next to the human skin. The composition is preferably substantially free of carbon black and may include materials which reduce the odor or provide a pleasing odor. Dusting agents or mold lubricants may be used to facilitate molding of the garment and small amounts of plasticizers may be used if necessary to improve the flowability of the rubber.

The masticated rubber compositions for use in making rubber girdles preferably contain 10 to 50% by weight of non-black reinforcing fillers which produce high tensile strengths, such as finely divided silica, finely divided calcium silicate or the like. Suitable fillers include "Hi-Sil 101" (hydrated silica having an average particle size of about 0.025 micron), "Silene EF" (hydrated calcium silicate having an average particle size of about 0.030 micron) and "Hi-Sil 233" (hydrated silica having an average particle size of about 0.022 micron).

*Example I*

A masticated natural rubber compound is prepared as follows:

| | Parts by weight |
|---|---|
| Natural rubber (pale crepe) | 100 |
| Zinc oxide | 5 |
| Titanium dioxide | 10 |
| Hi-Sil 233 | 25 |
| Sulfur | 1.0 |
| Accelerator (benzothiazyl disulfide) | 1.5 |
| Accelerator (zinc dimethyl dithiocarbamate) | 0.4 |
| Stearic acid | 1.0 |
| Rosin oil | 1.0 |
| Antioxidant (heptylated diphenylamine) | 0.8 |

The materials are thoroughly mixed in a Banbury mixer and the resulting rubber composition is rolled into sheets and cut into pieces of suitable size for making a pantie girdle on apparatus of the type shown in FIGS. 15 to 24. Such pieces are then placed in such apparatus, and a girdle A as shown in FIGS. 1 to 14 is molded and cured according to the method previously described. The resulting girdle has tear resistance, oxidation resistance, tensile strength, and other properties which are excellent for this type of garment. Excellent results may also be obtained using the same composition with up to about 0.1 part by weight of a suitable odorant such as acetophenone, cinnamaldehyde, coumarin, methyl salicylate, vanillin, or the like and/or about 1 part by weight of a dusting agent such as Acrawax C. The composition may include antioxidants, such as B-L-E (a high temperature reaction product of diphenylamine and acetone) or the like, and various activators or accelerators, such as triethanolamine, zinc stearate, diphenylguanidine, tetraethyl thiuram disulfide, zinc diethyl dithiocarbamate, 2-mercaptobenzothiazole, N-cyclohexyl-2-benzothiazole sulfenamide or the like.

It will be understood that percentages and "parts" refer to amounts by weight wherever they appear in the specification or claims with respect to rubber compositions.

Figure 31:
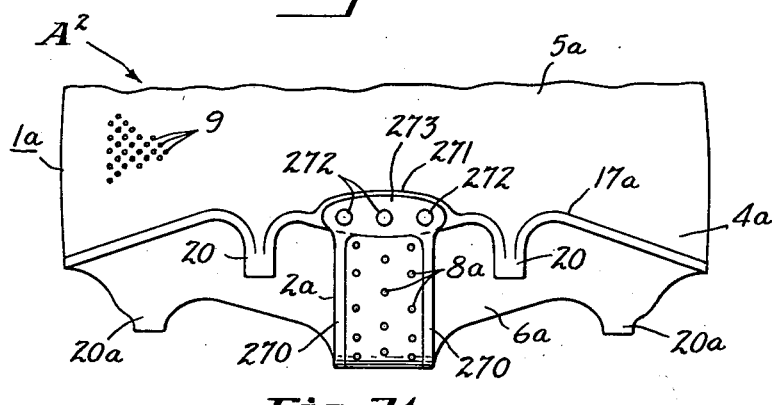
FIGURE 31 is a fragmentary front elevational view showing another modified form of pantie girdle according to the present invention.
Figure 28:
FIGURE 28 is a fragmentary end elevation showing the garter tab of FIG. 27.
Figure 29:
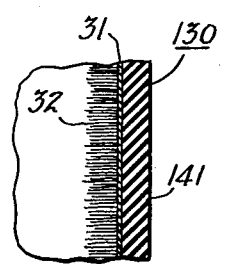
FIGURE 29 is a fragmentary vertical sectional view taken on the line 29—29 of FIGURE 25 on a larger scale.

FIGURE 31 shows another modified form of girdle A² which is almost identical to the girdle A described above but has a crotch portion 2a, integrally attached to the main wall 1a of the girdle, which may be detached from the front panel 5a. The girdle A² is molded in one piece in substantially the same manner as the girdle A so as to provide an endless main wall or band 1a having a front panel 5a and a rear panel 6a. The said front and rear panels are identical with the panels 5 and 6 except in the vicinity of the leg opening 4a and have perforations 9 and garter tabs 20 and 20a identical with the corresponding elements of the girdle A as is apparent from FIGURE 31. The marginal reinforcement 17a surrounding the leg opening 4a is substantially the same as the marginal reinforcement 17 but has straight portions 270 extending along the sides of the crotch strap 2a and has a widened portion 271 similar to the portion 155 for attachment of conventional snap fasteners 272.

The end portion 273 of the crotch strap is rounded and thickened like the portion 271 so as to reinforce the strap where the fasteners 272 are located. The fasteners 272 may be identical with the fasteners 158 described above and will permit attachment of or removal of the end portion 273 as will be apparent from FIGURE 31.

It will be understood that the above description is by way of illustration rather than limitation and that, in accordance with the provisions of the patent laws, variations and modifications of the specific articles disclosed herein may be made without departing from the spirit of the invention.

Having described my invention, I claim:

1. An integrally molded one-piece elastic pantie girdle formed of a homogeneous masticated rubber compound containing 45 to 65 percent by weight of natural rubber and 20 to 40 percent by weight of an inorganic reinforcing filler, said rubber compound being substantially free of carbon black, said girdle having an endless perforated elastic main wall for encircling the lower human torso which wall forms a waist opening at its upper edge, the front and rear portions of the endless main wall being united to provide an integral perforated crotch portion with leg openings on opposite sides thereof, said girdle being homogeneous throughout and having integral portions extending downwardly from the bottom edge of the girdle at the leg openings to provide extensible garter tabs, said girdle having ridges of minute size at the sides of the main wall and at the margins of the waist and leg openings, each ridge having a substantially uniform pointed cross section throughout its length and having a height less than 5 percent of the average thickness of the main wall, the ridges at said leg openings extending around the garter tabs, the ridges at each side of the main wall extending vertically from the waist opening to a leg opening.

2. A pressure molded one-piece girdle as defined in claim 1 wherein the main wall has an extensible portion of substantially uniform thickness directly above each garter tab which thickness is about the same as the average thickness of the main wall to permit stretching of the main wall when a downward force is applied to the garter tab, each said extensible portion having a substantially uniform thickness of about 0.02 to 0.04 inch within an area at least about 3 inches square, each garter tab gradually increasing in thickness in a downward direction, whereby the upper portion of the tab stretches with the adjacent extensible portion of the main wall and assists in shaping the body, each garter tab on the front of the girdle gradually changing in thickness about 0.03 to 0.06 inch per vertical inch.

3. A pressure molded one-piece girdle as defined in claim 2 wherein each garter tab is provided with a horizontal garter-supporting passage at its lower end and a sleeve of relatively non-stretchable reinforcing material is vulcanized to the garter tab and surrounds said horizontal passage, said sleeve extending substantially the full length of said horizontal passage.

4. A girdle as defined in claim 3 wherein said sleeve is a braided cloth tube.

5. A girdle as defined in claim 1 wherein the walls of the girdle have thickened hand-shaped hip-engaging portions which gradually decrease in thickness at their margins, said areas having elongated diverging fingers extending downwardly generally from the top toward the bottom of the girdle for engaging the hip and the upper portion of the buttocks and terminating a distance from the nearest upper side edge of the girdle which is at least one-third the average height of the girdle.

6. A girdle as defined in claim 5 wherein said hand-shaped portions extend throughout at least ninety percent of the length of the upper margin of the girdle and include a thumb-shaped portion extending across part of the front wall of the girdle.

7. A pressure-molded girdle as defined in claim 1 wherein the main wall has front and rear elastic panels, the rear panel having spaced reinforcing ribs extending generally in a circumferential direction, said ribs being inclined no more than about 30 degrees relative to the horizontal when the girdle is in a normal upright position and being located in the lower portion of the rear panel for engagement with the inwardly curved portion of the buttocks, said ribs extending horizontally at least 70 percent of the width of the rear panel and engaging the buttocks about 60 to 90 percent of the way down from the top edge of the girdle.

8. A one-piece elastic rubber girdle comprising an endless perforated elastic main wall for encircling the lower human torso which wall forms a waist opening at the upper end thereof and at least one leg opening at the lower end thereof, said girdle having hand-shaped reinforcing areas at the upper sides of the girdle which are thicker than the main portion of the girdle, each of said reinforcing areas extending generally through at least about one-third the circumference of said band and having a series of downwardly pointing diverging reinforcing fingers terminating a distance from the nearest upper side edge of the girdle which is about one-third to one-half the average height of the girdle, the fingers at one side of the girdle converging generally toward the fingers at the opposite side of the girdle, each finger gradually decreasing in thickness at its margins.

9. A molded one-piece rubber girdle as defined in claim 8, wherein five fingers are provided at each side of the girdle, one of each five fingers being located on the front half of the band and the remaining four fingers being located on the rear half of the girdle, the fingers having an average width of about 0.4 to 0.7 inch and an average length of about 3 to 4 inches.

10. A one-piece elastic rubber girdle having a waist opening and at least one leg-receiving opening and comprising an endless perforated main wall for encircling the lower human torso, said main wall having front and rear elastic panels, portions of the main wall being thicker than the main portion of said wall to provide reinforcing areas at the upper sides of the wall, each of said reinforcing areas extending generally through at least about one-third the circumference of said wall and having a series of downwardly pointing diverging reinforcing fingers terminating a distance from the nearest upper side edge of the wall which is about one-third to one-half the average height of the wall, the fingers at one side of the wall converging generally toward the fingers at the opposite side of the wall, each finger gradually decreasing in thickness at its margins, said fingers being located in the upper portion of the rear panel, the lower portion of said rear panel having a reinforced area formed by reinforcing ribs extending generally in a circumferential direction and inclined no more than about 30 degrees relative to the horizontal when the girdle is in a normal upright position, said reinforced area being located to engage the buttocks about 60 to 90 percent of the way down from the top edge of the girdle and having greater average thickness and greater resistance to stretching than the major portion of said main wall so as to provide means for imparting lift to the buttocks, said reinforced area extending horizontally at least 70 percent of the width of the rear panel.

11. A one-piece rubber girdle having an endless perforated elastic main wall for encircling the lower human torso that forms an upper waist opening and at least one lower leg opening, said main wall having stretchable front and rear panels, said rear panel having means for imparting lift to the buttocks comprising spaced reinforcing ribs extending generally in a circumferential direction for engaging the inwardly curved portion of the buttocks about 60 to 90 percent of the way down from the top edge of the girdle, said main wall having thickened hip-engaging reinforcing areas at the upper sides of the girdle with a series of downwardly pointing fingers on said rear panel terminating a distance from the nearest upper side edge of the girdle which is about one-third to one-half the average height of the girdle.

References Cited in the file of this patent

UNITED STATES PATENTS

| | | |
|---|---|---|
| 1,523,119 | Guinzburg | Jan. 13, 1925 |
| 2,077,514 | Callahan | Apr. 20, 1937 |
| 2,285,217 | Martin | June 2, 1942 |
| 2,360,736 | Spanel | Oct. 17, 1944 |
| 2,365,016 | Spanel | Dec. 12, 1944 |
| 2,428,252 | Von Stroh | Sept. 30, 1947 |
| 2,466,540 | Feigenbaum | Apr. 5, 1949 |
| 2,605,504 | Feldman | Aug. 5, 1952 |
| 2,636,173 | Barth | Apr. 28, 1953 |
| 2,705,798 | Rosenberg | Apr. 12, 1955 |
| 2,708,271 | Steinberg | May 17, 1955 |
| 2,749,549 | Ambrose | June 12, 1956 |
| 2,770,808 | Bader et al. | Nov. 20, 1956 |
| 2,790,998 | Dimmer | May 7, 1957 |
| 2,806,257 | Rosenberg | Sept. 17, 1957 |
| 2,813,526 | Beebe | Nov. 19, 1957 |
| 2,830,591 | Spanel et al. | Apr. 15, 1958 |
| 2,851,734 | Schnell et al. | Sept. 16, 1958 |
| 2,877,497 | Mercier | Mar. 17, 1959 |

FOREIGN PATENTS

| | | |
|---|---|---|
| 235,056 | Great Britain | June 11, 1925 |